(12) United States Patent
Delp et al.

(10) Patent No.: US 7,690,350 B2
(45) Date of Patent: Apr. 6, 2010

(54) METHOD AND DEVICE FOR CONTROLLING AN INTERNAL COMBUSTION ENGINE WITH VARIABLE VALVE LIFT AND MOTOR VEHICLE EQUIPPED THEREWITH

(75) Inventors: Matthias Delp, Bad Abbach (DE);
Jürgen Dingl, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 12/350,465

(22) Filed: Jan. 8, 2009

(65) Prior Publication Data

US 2009/0178644 A1 Jul. 16, 2009

(30) Foreign Application Priority Data

Jan. 10, 2008 (DE) .................. 10 2008 003 832

(51) Int. Cl.
*F02D 13/00* (2006.01)
(52) U.S. Cl. ..................... 123/345; 123/90.15
(58) Field of Classification Search .............. 123/345, 123/346, 90.15
See application file for complete search history.

(56) References Cited

U.S. PATENT DOCUMENTS

| | | | | |
|---|---|---|---|---|
| 6,863,048 | B2* | 3/2005 | Burkhard et al. | 123/325 |
| 6,866,020 | B2* | 3/2005 | Allston et al. | 123/399 |
| 7,386,387 | B2* | 6/2008 | Bauer et al. | 701/103 |
| 2007/0234985 | A1* | 10/2007 | Kolmanovsky | 123/90.15 |
| 2008/0035084 | A1* | 2/2008 | Leiby et al. | 123/90.16 |
| 2009/0007866 | A1* | 1/2009 | Nakamura | 123/90.15 |
| 2009/0095244 | A1* | 4/2009 | Leone et al. | 123/179.16 |

FOREIGN PATENT DOCUMENTS

| | | |
|---|---|---|
| JP | 8170549 | 7/1996 |
| JP | 9256879 | 9/1997 |
| JP | 2002180877 | 6/2002 |
| JP | 2004176642 | 6/2004 |
| JP | 2005172593 | 6/2005 |
| JP | 2005240750 | 9/2005 |

* cited by examiner

*Primary Examiner*—Hai H Huynh
(74) *Attorney, Agent, or Firm*—King & Spalding L.L.P.

(57) ABSTRACT

A method for controlling an internal combustion engine with variable valve lift has the following steps: Determining the pressure in the intake manifold; predetermining the pressure in the intake manifold following a changeover of the valve lift; determining a selection criterion for a valve lift to be set; and setting that valve lift at which the higher pressure is reached in the intake manifold, unless the selection criterion requires the use of the valve lift at which the lower pressure is reached in the intake manifold.

20 Claims, 1 Drawing Sheet

METHOD AND DEVICE FOR CONTROLLING AN INTERNAL COMBUSTION ENGINE WITH VARIABLE VALVE LIFT AND MOTOR VEHICLE EQUIPPED THEREWITH

CROSS-REFERENCE TO RELATED APPLICATIONS

This application claims priority to German Patent Application No. 10 2008 003 832.6 filed Jan. 10, 2008, the contents of which is incorporated herein by reference in its entirety.

TECHNICAL FIELD

The invention relates to a method and a device for controlling an internal combustion engine with variable valve lift. Such engines with two- or multi-stage valve lift changeover can be operated almost dethrottled in a greater number of operating states compared with internal combustion engines with fixed valve lift. This mode of operation has a good degree of efficiency, as is known. The invention is concerned in particular with the task of determining the operating points at which changeover from the one to the other valve lift is to take place.

BACKGROUND

A method is known from the prior art for adapting an internal combustion engine to different operating states by providing a two- or multi-stage valve lift changeover. For example, an electrohydraulic valve lift changeover can be implemented by actuating a locking element into a shift cam follower by means of oil pressure against a spring. According to the activation or deactivation state, the cam follower switches between two different elevation cams of the camshaft. To effect the changeover, a magnetic valve situated in the oil circulation system is energized, which opens thereupon. The oil pressure builds up and the locking element moves against a spring until the locking process has been completed. When the magnetic valve is closed again, the oil pressure decreases by way of an oil leakage pipe and the locking element slides back into its home position as the result of spring force. Apart from this described two-stage system, multi-stage or continuously operating valve lift changeovers are also commonly encountered.

A further method is known from the prior art for storing the operating points for the switch from one nominal value for the valve lift to another nominal value in characteristic maps and switching in accordance with the operating state of the engine. According to the prior art, possible parameters for controlling the valve lift changeover are the air mass nominal value and the engine rotational speed. For example, in the case of a low air mass nominal value a small valve lift is selected and in the case of a high air mass nominal value a large valve lift is selected. Between these, a changeover which is as torque-neutral as possible is aimed for.

SUMMARY

According to various embodiments, an optimized method and also a device for implementing the method can be set down, with which the operating points for the switch in the valve lift can be determined more reliably. Furthermore, according to various embodiments, a method and also a device for controlling an internal combustion engine with variable valve lift can be set down, through which pollutant emissions can be reduced and fuel can be saved.

According to an embodiment, a method for controlling an internal combustion engine with variable valve lift, may comprise the following steps: Determining the pressure in the intake manifold for the current valve lift; Predetermining the pressure in the intake manifold following a changeover of the valve lift; Determining a selection criterion for a valve lift to be set; and Setting the valve lift at which the higher pressure is reached in the intake manifold, unless the selection criterion requires the use of the valve lift at which the lower pressure is reached in the intake manifold.

According to a further embodiment, the valve lift can be selected at which the lower pressure is reached in the intake manifold if the current torque delivery in the valve lift at which the higher pressure is reached in the intake manifold cannot be achieved. According to a further embodiment, the valve lift can be chosen at which the lower pressure is reached in the intake manifold if a registered driver input cannot be implemented in the valve lift at which the higher pressure is reached in the intake manifold. According to a further embodiment, the valve lift can be chosen at which the lower pressure is reached in the intake manifold in order to prevent the internal combustion engine from entering an operating state which cannot be set with the two possible settings for the valve lift. According to a further embodiment, the internal combustion engine can be operated with the valve lift at which the higher pressure is reached in the intake manifold if the internal combustion engine is operated at an operating point having a rotational speed below the intersection point of two mass flow curves. According to a further embodiment, at the operating point having a rotational speed below the intersection point of two mass flow curves approx. 5% to approx. 40%, in particular approx. 10% to approx. 30%, of the maximum torque can be delivered. According to a further embodiment, the current pressure in the intake manifold and the pressure resulting after a valve lift changeover can be determined at predefinable time intervals. According to a further embodiment, the time interval may be approx. 5 ms to approx. 100 ms. According to a further embodiment, the current pressure in the intake manifold and the pressure resulting after a valve lift changeover can be determined in an event driven manner. According to a further embodiment, the event can be selected from a driver input and/or a change in the drive position and/or the switching state of a consumer load and/or the intervention of a slip control facility.

According to another embodiment, a device for controlling an internal combustion engine with variable valve lift, may comprise a facility for registering the torque and also the pressure in the intake manifold, and also means for predetermining the pressure following a changeover of the valve lift, whereby means are provided for setting the valve lift for the purpose of setting that valve lift at which the higher pressure is reached in the intake manifold, unless means for predetermining the valve lift nominal value require the use of the valve lift at which the lower pressure is reached in the intake manifold.

According to a further embodiment, the means for predetermining the valve lift nominal value can be set up in order to check whether the current torque delivery can be achieved with the valve lift at which the higher pressure is reached in the intake manifold. According to a further embodiment, means can be provided for registering a driver input and the means for predetermining the valve lift nominal value are set up in order to check whether a registered driver input can be realized with the valve lift at which the higher pressure is reached in the intake manifold. According to a further embodiment, the means for predetermining the valve lift nominal value can be set up in order to check whether torque-neutral changeover of the valve lift is possible. According to a further embodiment, the means for predetermining the valve lift nominal value and/or the means for predetermining the pressure following a changeover of the valve lift may comprise a numeric characteristic map matrix and/or a microprocessor and/or a neural network. According to a further embodiment, a timer can be provided for determining a predefinable period of time.

According to yet another embodiment, a motor vehicle may have such a device for controlling an internal combustion engine as described above.

BRIEF DESCRIPTION OF THE DRAWINGS

The invention will be described in detail in the following with reference to an embodiment.

FIG. 1 shows entered in bold print the particular valve lift which results with regard to the valve lift control in accordance with the air mass taken in.

FIG. 2 shows emphasized in bold print the particular setting for the valve lift which is selected in accordance with the method.

DETAILED DESCRIPTION

Figure 1:
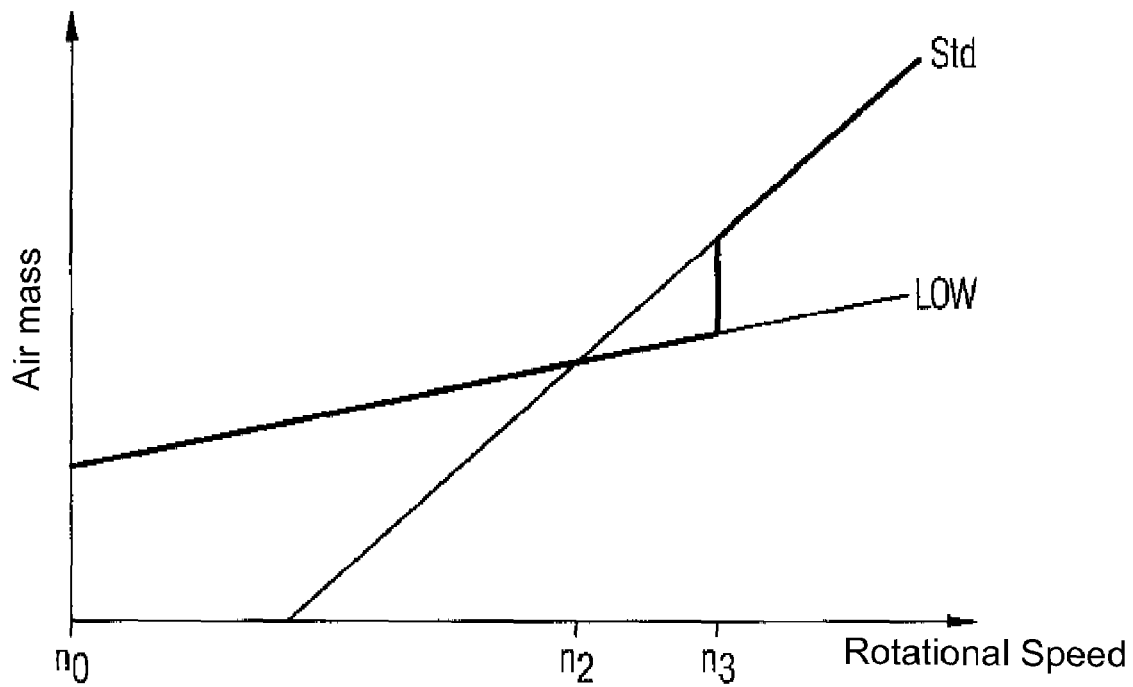
FIGS. 1 and 2 show the relationship between the air mass taken in and the engine rotational speed for two different settings of the valve lift.

According to various embodiments, in a method for controlling an internal combustion engine with variable valve lift, the pressure prevailing in the intake manifold is initially determined. Subsequently, in the engine control unit the pressure in the intake manifold is determined following a changeover in the valve lift. Subsequently, that valve lift is always set at which the higher pressure is reached in the intake manifold, unless a selection criterion exceptionally exists which requires the use of that valve lift at which the lower pressure is reached in the intake manifold.

Furthermore, according to other various embodiments, a device for controlling an internal combustion engine with variable valve lift, has a facility for registering the torque and also the pressure in the intake manifold, and also means for predetermining the pressure following a changeover of the valve lift, whereby means are provided for setting the valve lift for the purpose of setting that valve lift at which the higher pressure is reached in the intake manifold, unless means for predetermining the valve lift nominal value require the use of the valve lift at which the lower pressure is reached.

According to various embodiments, it has been recognized that optimized operation of an internal combustion engine is achieved with a plurality of possible switching states for the valve lift in a particularly simple manner if, instead of the air mass nominal value, the pressure in the intake manifold is employed for taking the decision as to whether or not a valve lift changeover is required. In this situation, it has become apparent that the decision in favor of a valve lift changeover as a result of the intake manifold pressure can manage with the simple criterion of choosing as a rule that valve lift at which the higher intake manifold pressure is reached. Only in a few, selected operating states which need to be monitored separately in the engine control unit should a different valve lift exceptionally be chosen. As a rule, the operating state with the highest intake manifold pressure is that operating state in which the throttle valve exhibits the greatest opening. The operating state with the highest intake manifold pressure is thus characterized by the fact that the smallest throttling losses occur.

Although the invention is described by way of example of a two-stage valve lift changeover, the person skilled in the art will also be able to apply the disclosed principle without further ado to multi-stage or variable valve lift changeovers.

The necessary determination of the current pressure in the intake manifold can be effected according to various embodiments in an especially simple manner by means of a pressure sensor in the intake tract. Depending on the measuring location, it may become necessary in this situation to correct the measured pressure in the engine control unit to a pressure actually present at the inlet valve. To this end, the measured value can be calculated with correction values or a corrected value from the measured value can be read out from a characteristic map. In an alternative embodiment, the determination of the current pressure is however also indirectly possible through a characteristic map or a neural network or through calculation from other measurement variables. For example, the current pressure in the intake manifold can be ascertained depending on the rotational speed, the air mass and the temperature in road trials and/or testbed trials and then ascertained from these measurement variables by the control unit during operation of the internal combustion engine.

In order to decide whether the pressure in the intake manifold is higher at the currently selected setting for the valve lift or at a different setting for the valve lift, the intake manifold pressure must be ascertained at the other valve lift setting in each case. By preference, but not mandatorily, this ascertainment takes place either through computation, through reading out from a characteristic map or by means of a neural network. Alternatively, the engine control unit can also initiate the changeover to the other valve lift in each case on a trial basis and determine the intake manifold pressure which is reached as a result by means of measurement. Provided the intake manifold pressure in question is higher in this situation, no changeover back to the valve lift originally chosen takes place. In the case of a lower intake manifold pressure, a changeover back is initiated after several engine cycles.

According to an embodiment, the determination of the pressure in the intake manifold for two valve lifts can take place not only for the current operating point of the internal combustion engine but also for an operating point present in the future if the latter is reached in the foreseeable future or could be reached with a certain probability, for example as a result of an already registered driver input.

In order to avoid the changeover to a valve lift which is inappropriate in the individual case, a selection criterion continues to be determined which avoids such a changeover in selected operating states, even if an in itself advantageous increase in the intake manifold pressure were associated with this. Such operating points can for example be stored in the engine control unit. For example, such an operating state is present if the currently required torque delivery in the case of the valve lift at which the higher pressure is reached in the intake manifold cannot be achieved. In this case, a changeover must not happen in order not to provoke a collapse of the torque.

Furthermore, a changeover must also not happen in the situation when a registered driver input leads to the expectation that an implementation of the torque delivery possibly required in the future cannot be realized with the valve lift at which the higher pressure is reached in the intake manifold. For this purpose the engine control unit preferably contains forecasting means in order to estimate with the highest possible degree of accuracy a torque delivery becoming necessary in the future.

According to an embodiment, operating states are also avoided from which a changeover is no longer possible without changing the delivered torque. For example, this can be an operating point in the upper partial-load operational range, which can still be represented with a low valve lift but with which, on account of the great air mass difference from an operating point having the same rotational speed and torque with a high valve lift, a torque-neutral changeover is no longer possible. Taking such a blind alley is reliably prevented by the preferred development.

Furthermore, provision can be made to omit an island point, at which the preferred increase in pressure is reached only in a narrow rotational speed range, from a changeover and thus to minimize the number of changeover processes.

It has been found, completely surprisingly, that contrary to the control methods used previously the fuel consumption and the pollutant emissions can also be reduced in the lower partial-load operational range, at comparatively low torques, if the internal combustion engine is operated with a large valve lift and dethrottling. As a result of the small air mass taken in at a low rotational speed, a higher intake manifold pressure is then reached again than is the case with the same operating point with a small valve lift. In this situation, an operating point with low torque delivery is understood to be an operating point at which approx. 5% to approx. 40%, in particular approx. 10% to approx. 30%, of the maximum torque is delivered.

The decision as to whether or not a valve lift changeover is required can be taken by the engine control unit, at predefinable time intervals for example. In particular, such a time interval can be approx. 5 ms to approx. 100 ms. In this situation, either a fixed time interval can be chosen or the time interval can be adapted dynamically to the operating conditions, the rotational speed for example. Such a rotational speed dependent time interval can for example be realized by the fact that the intake manifold pressure is determined every n crank rotations. When choosing the number n, the person skilled in the art will in particular consider a value from the range from approx. 2 to approx. 100.

In an alternative embodiment, the current pressure in the intake manifold and the pressure in the intake manifold arising in a valve lift changeover can also be determined in an event driven manner. The event upon which the previously set valve lift is subjected to checking can for example be a change in the driver input and/or a change in the drive position and/or a switching state of a consumer load and/or the detection of wheel slip. This listing is naturally not exclusive. Rather, any event having an influence on the torque delivery or the torque nominal value for the internal combustion engine comes into consideration. The proposed method according to various embodiments for controlling an internal combustion engine is particularly suitable for internal combustion engines which are incorporated in a motor vehicle. In addition, use in boats or small aircraft is also possible. The various embodiments are particularly suitable for use in conjunction with an internal combustion engine having spark ignition.

FIG. 1 shows the air mass taken in by the internal combustion engine on the vertical axis plotted against the rotational speed of the internal combustion engine. The maximum possible intake air mass changes as a result of the valve lift set. In this situation, the first, gentler linear slope, which is designated as "LOW", represents the mass flow behavior for a setting with low valve lift. The second, steeper linear slope, which is designated as "Std", represents the mass flow behavior for a setting with higher valve lift.

According to the prior art, the higher setting for the valve lift is always used whenever a large air mass needs to be fed to the internal combustion engine in the upper load range.

Based on the maximum rotational speed, a power limiting of the internal combustion engine takes place due to the fact that the pressure in the intake manifold is reduced by means of a throttle valve. As a result of the lower intake manifold pressure, given the same opening lift for the inlet valve a smaller air mass enters the cylinder. In order to maintain the ideal, stoichiometric fuel/air ratio the injected fuel quantity is reduced together with the air mass taken in.

In the case of a further reduction in rotational speed and torque, the changeover to a smaller valve lift takes place at a predefinable threshold $n_3$ stored in the engine control unit. In order to keep the air mass taken in constant, the throttle valve is simultaneously opened again. This opening causes a pressure rise in the intake manifold. As a result, the throttling losses are reduced. Furthermore, the inflow speed of the air taken in at the inlet valve is increased. The turbulence produced as a result improves the intermixing of the fuel/air mixture and thus the combustion.

Based on the switching rotational speed $n_3$, the rotational speed and the torque can now be further reduced by successively closing the throttle valve and reducing the injected fuel quantity correspondingly. In this manner the internal combustion engine can be throttled right down to the idling rotational speed.

Figure 2:
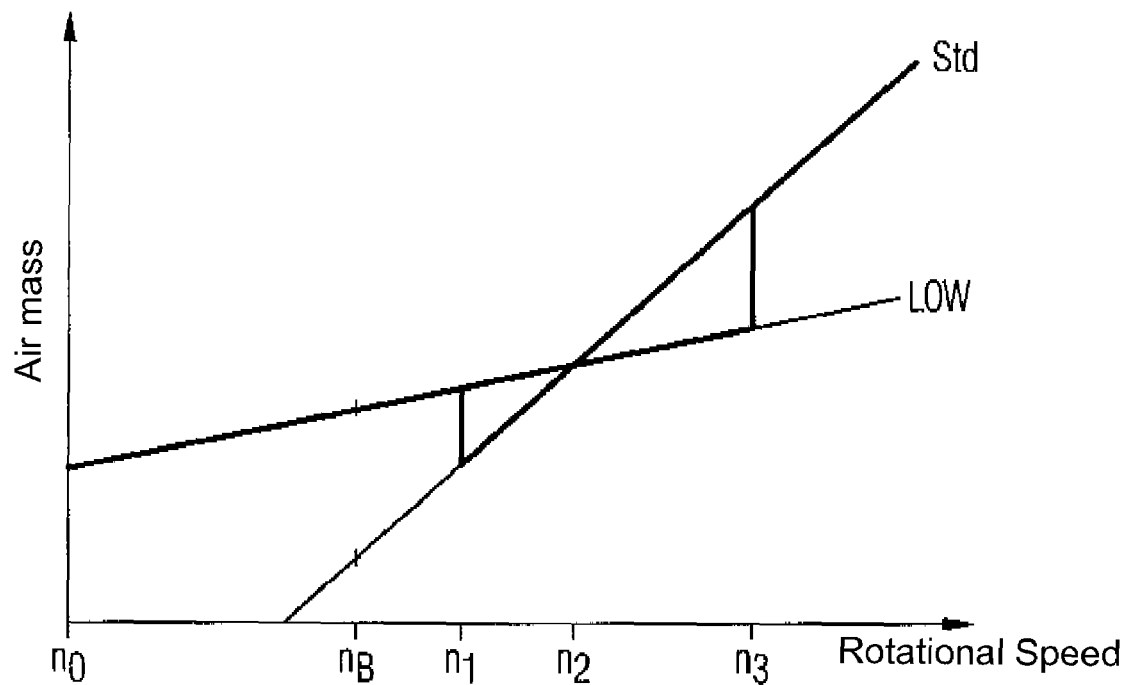

FIG. 2 shows emphasized in bold print the particular valve lift which is set on account of the selection criterion according to various embodiments for the intake manifold pressure. On the basis of the highest power and the highest rotational speed of the internal combustion engine, the greatest possible available valve lift must in turn be chosen. Up to the first switching point $n_3$ the power and the torque of the internal combustion engine are reduced by restricting the air supply.

At switching point n3 an operating state is reached which can be realized both with a large valve lift and also with a small valve lift. Therefore, the operating states between the switching points $n_1$ and $n_3$ can be utilized for the torque-neutral changeover of the valve lift. For selection of the valve lift to be used in each case, the criterion whereby the internal combustion engine should be operated as dethrottled as possible is applied. An opened throttle valve expresses itself in a higher intake manifold pressure than arises when the throttle valve is closed.

The engine control unit therefore switches dynamically between the two valve lift settings in the range between the switching points $n_1$ and $n_3$, such that the greater intake manifold pressure results in each case. As a result, between the switching points $n_1$ and $n_3$ the internal combustion engine is always situated in the optimum efficiency range.

It is proposed in particular according to various embodiments to also change over to the greater valve lift on a case by case basis between the switching points $n_1$ and $n_2$, at which according to the prior art a changeover to the greater valve lift never took place. If the internal combustion engine is regarded as a vacuum pump which evacuates the volume of the intake manifold, then the throughput of this pump drops off as the rotational speed decreases. It has been found, completely surprisingly, that in the case of an operating point below the intersection point $n_2$ of the mass flow characteristics the pumping speed drops off strongly and as a result of this the intake manifold pressure, which falls as restriction increases, rises again. It is thus also possible to operate the engine efficiently with a large valve lift and dethrottling in the interval between the switching points $n_1$ and $n_2$. Only at rotational speeds which lie beneath the threshold $n_1$ is a torque-neutral changeover from large valve lift to small valve lift no longer possible. Therefore, as a precaution, at switching threshold $n_1$ a changeover to small valve lift is effected and the engine has its torque delivery limited by closing the throttle valve.

As a result of this premature changeover at the threshold $n_1$ a situation is avoided whereby a driver who at the operating point $n_B$ chosen by way of example is running his internal combustion engine fuel-efficiently with a large valve lift, in the case of a further, considerable lowering of the rotational speed gets into an operating state which is not feasible with a large valve lift. On the basis of $n_B$, a changeover to a small valve lift would only be possible if the rotational speed were to rise again beforehand up to the threshold $n_1$. Such a rise in rotational speed and torque conflicting with the driver input would however be surprising and thus dangerous. At the rotational speed $n_B$ and a large valve lift the operating state therefore constitutes a blind alley which will not be actuated by the control unit. In the case of a reduction in rotational speed below $n_1$, the smaller valve lift is always chosen. In analogous fashion, an operating point above $n_3$ is only actuated with the large valve lift.

The invention has been described above with reference to functional units. The person skilled in the art will implement these functional units from case to case as hardware modules or in the form of software. For example, the method according to the invention can be implemented by means of a microprocessor, a microcontroller, an ASIC or an FPGA.

What is claimed is:

1. A method for controlling an internal combustion engine with variable valve lift and including at least two valve lifts, comprising the following steps:
   determining the pressure in the intake manifold for a first, current valve lift;
   determining the pressure in the intake manifold corresponding to a changeover of the valve lift from the current valve lift to a second valve lift;
   comparing the two pressures to determine which of the first and second valve lifts provides a higher intake manifold pressure;
   determining whether a valve lift selection criterion for a valve lift to be set is met; and
   if the valve lift selection criterion is not met, selecting for use the valve lift determined to provide the higher intake manifold pressure; and
   if the valve lift selection criterion is met, selecting for use the valve lift determined to provide the lower intake manifold pressure.

2. The method according to claim 1, wherein the valve lift determined to provide the lower intake manifold pressure is selected if the current torque delivery in the valve lift determined to provide the higher intake manifold pressure cannot be achieved.

3. The method according to claim 1, wherein the valve lift determined to provide the lower intake manifold pressure is selected if a registered driver input cannot be implemented in the valve lift determined to provide the higher intake manifold pressure.

4. The method according to claim 1, wherein the valve lift determined to provide the lower intake manifold pressure is selected in order to prevent the internal combustion engine from entering an operating state which cannot be set with the two possible settings for the valve lift.

5. The method according to claim 1, wherein the internal combustion engine is operated with the valve lift determined to provide the higher intake manifold pressure if the internal combustion engine is operated at an operating point having a rotational speed below the intersection point of two mass flow curves.

6. The method according to claim 5, wherein at the operating point having a rotational speed below the intersection point of two mass flow curves approx. 5% to approx. 40% of the maximum torque is delivered.

7. The method according to claim 5, wherein at the operating point having a rotational speed below the intersection point of two mass flow curves approx. 10% to approx. 30% of the maximum torque is delivered.

8. The method according to claim 1, wherein the current pressure in the intake manifold and the pressure resulting after a valve lift changeover are determined at predefinable time intervals.

9. The method according to claim 8, wherein the time interval is approx. 5 ms to approx. 100 ms.

10. The method according to claim 1, wherein the current pressure in the intake manifold and the pressure resulting after a valve lift changeover are determined in an event driven manner.

11. The method according to claim 10, wherein the event is selected from at least one of the group consisting of: a driver input, a change in the drive position, the switching state of a consumer load, and the intervention of a slip control facility.

12. A device for controlling an internal combustion engine with variable valve lift and including at least two valve lifts, comprising;
   a facility for registering the torque and also the pressure in the intake manifold corresponding to a first valve lift,
   means for predetermining the pressure corresponding to a changeover of the valve lift from the first valve lift to a second valve lift,
   means for comparing the intake manifold pressure corresponding the first valve lift with the intake manifold pressure corresponding the second valve lift; and
   means for setting the valve lift for the purpose of selecting the valve lift at which the higher pressure is reached in the intake manifold, based on the comparison between the intake manifold pressures corresponding to the first and second valve lifts, unless means for predetermining a valve lift nominal value require the use of the valve lift at which the lower pressure is reached in the intake manifold.

13. The device according to claim 12, wherein the means for predetermining the valve lift nominal value are set up in order to check whether the current torque delivery can be achieved with the valve lift at which the higher pressure is reached in the intake manifold.

14. The device according to claim 12, wherein means are provided for registering a driver input and the means for predetermining the valve lift nominal value are set up in order to check whether a registered driver input can be realized with the valve lift at which the higher pressure is reached in the intake manifold.

15. The device according to claim 12, wherein the means for predetermining the valve lift nominal value are set up in order to check whether torque-neutral changeover of the valve lift is possible.

16. The device according to claim 12, wherein at least one of the means for predetermining the valve lift nominal value and the means for predetermining the pressure following a changeover of the valve lift comprise at least one of a numeric characteristic map matrix, a microprocessor, and a neural network.

17. The device according to claim 12, wherein a timer is provided for determining a predefinable period of time.

18. A motor vehicle comprising a device for controlling an internal combustion engine with variable valve lift and including at least two valve lifts, comprising a facility for registering the torque and also the pressure in the intake manifold corresponding to a first valve lift, means for predetermining the pressure corresponding to a changeover of the valve lift from the first valve lift to a second valve lift, means for comparing the intake manifold pressure corresponding the first valve lift with the intake manifold pressure corresponding the second valve lift; and means for setting the valve lift for the purpose of setting selecting the valve lift at which the higher pressure is reached in the intake manifold, based on the comparison between the intake manifold pressures corresponding to the first and second valve lifts, unless means for predetermining a valve lift nominal value require the use of the valve lift at which the lower pressure is reached in the intake manifold.

19. The motor vehicle according to claim 18, wherein the means for predetermining the valve lift nominal value are set up in order to check whether the current torque delivery can be achieved with the valve lift at which the higher pressure is reached in the intake manifold.

20. The motor vehicle according to claim 18, wherein means are provided for registering a driver input and the means for predetermining the valve lift nominal value are set up in order to check whether a registered driver input can be realized with the valve lift at which the higher pressure is reached in the intake manifold.

* * * * *